April 8, 1930.    D. J. BRIMM, JR    1,753,770
RETRACTABLE LANDING GEAR
Filed Nov. 1, 1927    2 Sheets-Sheet 1
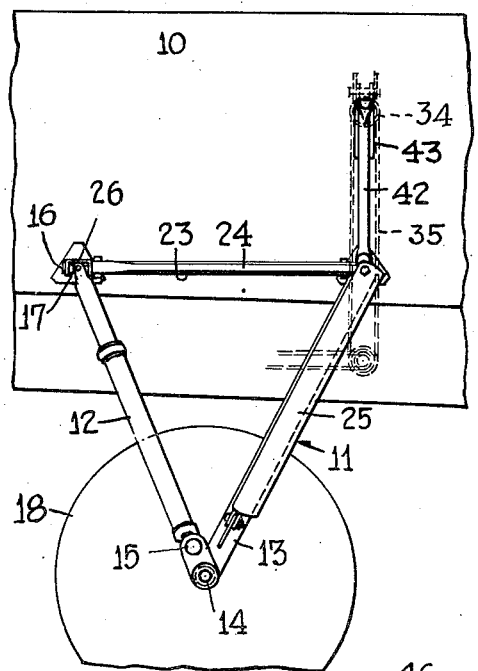
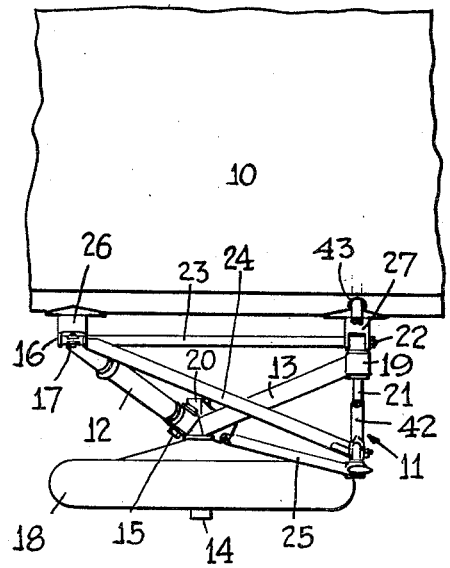
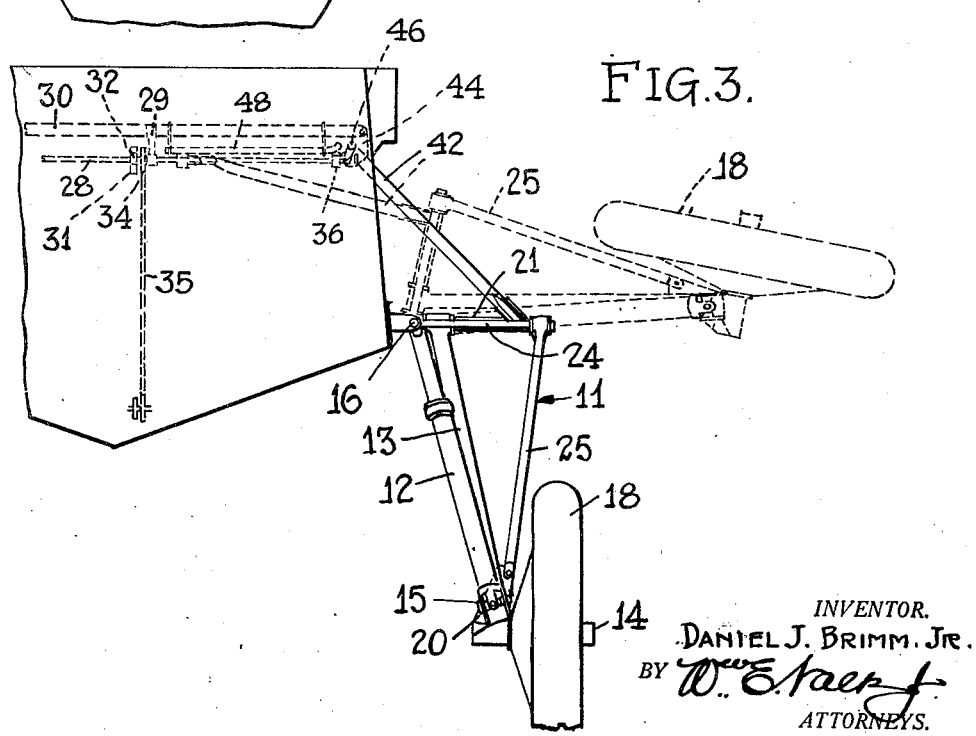
INVENTOR.
Daniel J. Brimm, Jr.
BY
ATTORNEYS.

April 8, 1930.  D. J. BRIMM, JR  1,753,770
RETRACTABLE LANDING GEAR
Filed Nov. 1, 1927   2 Sheets-Sheet 2
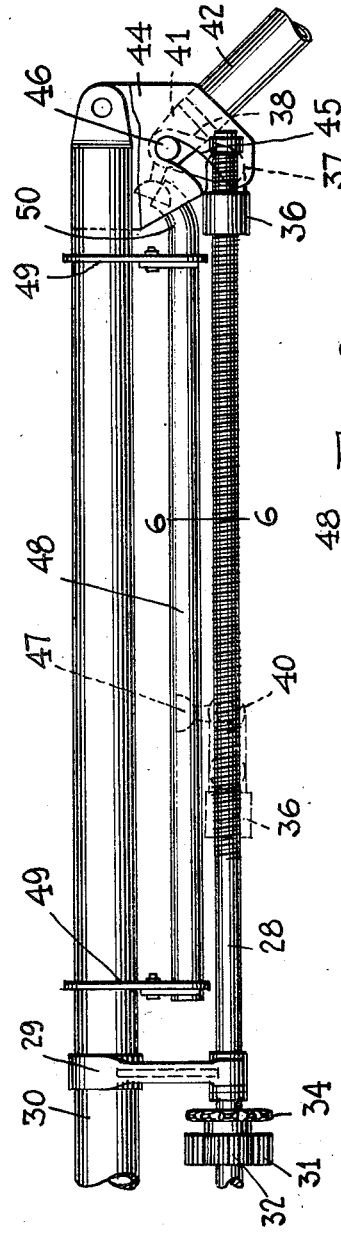
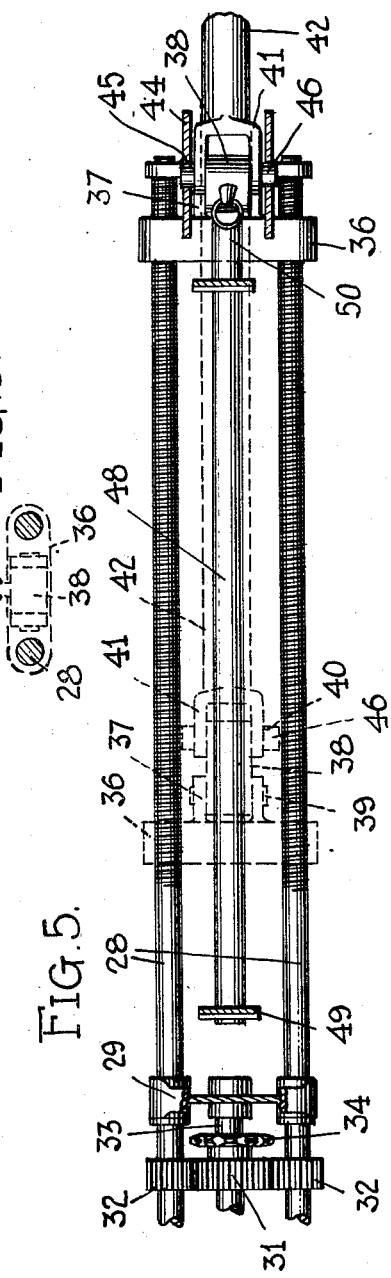
INVENTOR.
DANIEL J. BRIMM JR.

Patented Apr. 8, 1930

1,753,770

UNITED STATES PATENT OFFICE

DANIEL J. BRIMM, JR., OF WEST HEMPSTEAD, NEW YORK, ASSIGNOR TO IRELAND AIRCRAFT, INC., A CORPORATION OF NEW YORK

RETRACTABLE LANDING GEAR

Application filed November 1, 1927. Serial No. 230,242.

My invention relates to landing gears for aircraft and is more particularly concerned with a collapsible or retractable landing gear for aeroplanes.

An object of the invention is to provide a retractable landing gear in which the wheel carrying frames are widely spaced and so related to the hull or body of the aeroplane as to admit of the upward and outward folding movement thereof by pulling into and thru the side walls of the body certain braces which function as such and are pivotally fastened to the landing gear frames.

A further object of the invention is to provide an operating means for retracting and extending the landing gear frames which is positive and unfailing in operation; which, with the frames extended or lowered, is so related to certain frame brace members as to engage and lock said members against inward movement, and hence the landing gear against collapse; and which, under all operating conditions, is completely enclosed with the hull or body of the machine.

Other objects and advantages of the invention will be hereinafter disclosed.

In the drawings:

Fig. 1 is a side elevation of the landing gear;

Fig. 2 is a plan view of that portion of the landing gear illustrated in Fig. 1;

Fig. 3 is a front end elevation of half only of the landing gear, the dotted lines in said figure indicating the retracted position thereof;

Fig. 4 is a detail view of a substantial portion of the retracting mechanism;

Fig. 5 is a plan view of the mechanism illustrated in Fig. 4, and

Fig. 6 is a section on the line 6—6 of Fig. 4.

In the embodiment of the invention selected for illustration, an aeroplane of the so-called amphibian type is shown. Such aeroplane includes a hull or body portion 10 of more or less conventional design to which the wheeled landing gear is fastened and within which the operating mechanism for retracting and extending the landing gear is completely enclosed. The wheeled landing gear per se comprises two substantially triangulated frames disposed respectively one each at opposite sides of the machine. These frames, alike in construction, are designated as 11. Each consists of a forward yieldingly telescopic strut 12 and a rear rigid strut 13. The struts 12 and 13 are V-arranged (viewed from the side) and support at the foot thereof an axle stub 14. The forward and yieldingly telescopic strut 12 is pivoted at its lower end as at 15 and at its upper or inner end it is pivoted as at 16 and 17 respectively. The pivot axis 16 extends longitudinally of the machine and constitutes an axis about which the strut 12 swings with the landing gear frame in collapsing or folding the landing gear, whereas the pivot axis 17 extends transversely of the machine and constitutes an axis about which said strut is free to move as the strut sections telescope one within the other. A landing gear wheel 18 is mounted on said axle stub.

The rear or rigid strut 13 is provided at its inner or upper end with a collar 19. At its opposite end it is directly attached to a fitting 20 within which the axle stub 14 is fastened and to which the forward strut 12 is pivoted as at 15. As a support for the strut 13 an extension 21 is provided. Said extension projects laterally out from the side of the hull or body 10 and at its inner end it is pivoted as at 22 about the extended axis of the pivot 16 about which the landing gear is folded or collapsed. A two-point support for the frame 11 is thus provided. The extension 21, at or near the pivot 22 is carried thru the collar 19 of the rear or rigid strut 13 to provide, in effect, a transverse pivotal mounting about which said strut is free to move in a fore and aft direction. If desired, a rod 23, extending from one to the other of the struts 12 and 13 and defining the longitudinally extending pivot axes thereof, may be provided.

At its outer or free end the extension 21 is braced horizontally as at 24 and vertically as at 25. The brace 24 is carried to the point of attachment of the forward strut with the hull or body 10 and the brace 25 is carried to the fitting 20 at the foot of the landing gear struts. Like the strut 13, the brace 25 is adapted to pivot about the extension 21 as an axis. Collectively, the struts 12 and 13, the rod 23, the extension 21, and the braces 24 and 25, constitute the triangulated frame 11. Viewed from any angle, such framed parts, it will be observed, are arranged triangularly.

The supports for the frame 11, in each instance, form a composite part of the hull or body 10. To the outer or extended ends thereof the frames 11 are fastened. Preferably the supports, designated respectively as 26 and 27 are carried thru and across the body to cross-brace the frames. Where the body 10 is a hull, as herein shown, the points where the supports are carried thru the sides thereof, are but slightly removed from the chines.

The mechanism for retracting and extending the frames of the landing gear is wholly enclosed. Such mechanism comprises parallel worms 28—28, each having formed thereon, at opposite sides of the transverse center line thereof, right and left hand threads respectively. The worms 28 are mounted in bearings 29 hung from a cross-frame member 30 and in extending and retracting the frames 11 they (the worms) are adapted to be oppositely rotated. A driving gear 31, in mesh with two smaller gears 32, one on each worm, is provided to oppositely rotate said worms. The gear 31 is mounted on a shaft 33 and has associated with it a sprocket 34 over which a chain 35 is carried. By driving said chain thru any suitable means said gear 31, and hence the worms 28, are rotated. Preferably such driving mechanism (not shown) is located in convenient proximity to the pilot's seat.

At each side of the transverse center line of the parallel worms 28 a traveling collar or fitting 36 is provided. Said fittings 36 are in mesh with the threads or teeth of both worms 28 and are adapted to work back and forth longitudinally of said worms as the latter are rotated. Upon each said fitting 36 ears 37 are formed. Between said ears a link 38 is pivoted as at 39, the link at its opposite end being pivoted as at 40 in the forked end 41 of a brace member 42. Said brace member, at its opposite end, is fastened to the frame 11 to raise and lower it by and according to the back and forth movement of the traveling collar. An opening 43 is formed in the side of the body 10 to admit of the passage therethru of said brace.

Within the body 10, and directly adjacent the openings 43 formed therein, special abutment fittings 44 are provided. These fittings 44 are carried at the ends of the cross-frame member 30 and have formed therein an arcuate slot 45. The slots 45 are open at one end, i. e., that end adjacent to the worms 28, and in the operation of the retracting mechanism admit of the movement throughout the length thereof of a cross-pin 46 carried by the brace 42. In other words, as indicated in Fig. 4, the slots 45 act as cam surfaces to direct the inner brace ends into firm seating engagement within the special fittings. Said brace ends, thus seated, are incapable of inward movement without first being carried toward the open end of the slot and then pulled inwardly by the inward travel of the collar 36. The links 38, it will be noted, admit of the movement of the inner brace ends toward the inner slot ends when the latter have been forced outwardly as far as possible. To hold the inner brace end 42 at all times in line with the worms 28, a fitting 47, working in a guideway 48 is provided. Said guideway (see Fig. 4) is hung from the cross-frame member 30 by brackets 49 and at its outer end is curved upwardly as at 50, the curvature corresponding to that of the cam slot 45.

Thru the rotation of the gear 31 the worms 28 may be rotated in either direction. In rotating said worms in one direction the traveling collar 36 is made to move inwardly. As said collar is directly fastened, by means of the link 38 to the inner end of the brace 42, said brace, as the collar is thus moved, is pulled correspondingly within the hull or body to raise or retract its associated landing gear frame. Said brace, moreover, when extended, and with its inner end in seating engagement with the abutment fitting 44, functions merely as a diagonal brace for said frame. Thus constituted, the landing shocks are carried to the abutment fitting and not to the retracting mechanism if and when the landing gear is used.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. An aeroplane landing gear including a pair of landing gear supports, a pair of landing gear struts arranged to converge downwardly in substantially a longitudinal vertical plane, one of said struts being yieldingly telescopic and pivotally fastened to one of said supports and the other said strut being rigid and pivotally fastened adjacent to the other said support, the pivot axes in each instance being transversely extended, a wheel mounted at the foot of said struts, an extension provided at the outer end of one said supports, and braces carried from the outer end of said extension respectively to the foot of said struts, to the other said support, and to a point above said extension.

2. An aeroplane landing gear including, in combination with the body of the aeroplane, a pair of landing gear supports, each forming a composite part of said body and each at one end being extended thru and beyond one side wall thereof in the vicinity of its bottom, a pair of landing gear struts arranged to converge downwardly in substantially a longitudinal vertical plane, one of said struts being yieldingly telescopic and pivotally fastened to one of said supports and the other being rigid and pivotally fastened adjacent to the other of said supports, the pivot axes, in each instance, being transversely extended, a wheel mounted at the foot of said struts, an extension provided at the outer end of one said supports, and out-board braces carried from the outer end of said extension respectively to the foot of said struts, to the other said support, and to a point of attachment to said body above said extension.

3. In an aeroplane landing gear, two landing gear supports, an extension provided at the outer end of one said support, a yieldingly telescopic landing gear strut, pivoted at one end to the other said support, a rigid landing gear strut pivoted at one end to said extension adjacent to its point of attachment to said first mentioned support, an axle fitting to which both said struts are fastened at their opposite ends, and braces carried from the outer end of said extension respectively to said axle fitting, to the support to which the yieldingly telescopic landing gear strut is fastened, and to a point above said extension.

4. In a retractable landing gear, two landing gear supports, two landing gear struts, each of which at its inner end is pivotally mounted for movement in rectangularly opposed planes and one of which is yieldingly telescopic, an axle fitting to which both said struts are fastened at their opposite ends, an extension provided at the outer end of one said support and movable with said struts as the landing gear is retracted, braces carried from the outer end of said extension respectively to said axle fitting, to one said support, and to a point above said extension, and means engaging said last mentioned brace for retracting the landing gear.

5. A retractable landing gear including a rigid strut and a yieldingly telescopic strut, said struts at their inner ends being pivotally mounted for swinging movement in an outward and upward direction, an axle fitting to which both said struts are fastened at their opposite ends, an arm extending in an outward direction from the point of attachment of one said strut, said arm being movable with and as the landing gear is retracted, braces carried from the outer end of said extension to points above and below said extension, and means engaging one said brace to retract the landing gear.

6. In a retractable landing gear for aeroplanes, two landing gear supports, two landing gear struts pivotally fastened at their inner ends to said supports, an axle fitting to which both said struts are fastened at one end, an extension provided at the outer end of one said support, said extension being pivotally movable with both said struts when and as the landing gear is retracted, braces carried from the outer end of said extension to points above and below said extension, one of said braces being fastened at its opposite end to said axle fitting, and means engaging another of said braces to retract the landing gear.

7. In mechanism for operating a retractable landing gear for airplanes in which a lever having one end connected to a part of the retractable landing gear has the other end connected to a nut operating along a rotatable worm, and in which a linkage is interposed in the connection between the lever and the nut, a projection secured upon said lever, an abutment having a cam groove in which the projection may travel, and a closed end for said cam groove against which the projection may be urged to limit the movement of the lever whereby landing shocks may be transmitted to the closed end of the cam path and prevented from acting upon the worm and the nut carried by the worm.

8. In mechanism for operating a retractable landing gear for airplanes in which a lever having one end connected to a part of the retractable landing gear has the other end connected to a nut operating along a rotatable worm, and in which a linkage is interposed in the connection between the lever and the nut, a projection secured upon said lever, an abutment having a cam groove in which the projection may travel, a closed end for said cam groove against which the projection may be urged to limit the movement of the lever whereby landing shocks may be transmitted to the closed end of the cam groove and prevented from acting upon the worm and the nut carried by the worm, another projection secured to the said lever and adapted to act as a cam follower and another cam groove along which the last named projection may travel to guide the movement of the end of the lever connected to the nut throughout the movement of the landing gear.

9. In mechanism for retracting the landing gear of an airplane in which one end of a lever is connected to a part of the landing gear and in which the other end of the lever is connected to a movable element, a plurality of worm screws, a nut connected to said movable element and having a plurality of openings therein each opening being arranged for the reception of one of the worm screws, and means for turning the worm screws in synchronism to move the nut and consequently move the landing gear.

10. An airplane landing gear including a pair of rigid landing gear supports, a pair of landing gear struts arranged to converge downwardly in substantially a longitudinal vertical plane, one of said struts being yieldingly telescopic and pivotally fastened to one of said supports and the other said strut being rigid and pivotally fastened to the other said support, the pivot axis in each instance being transversely extended, a wheel mounted at the foot of said struts, and means for retracting said landing gear.

11. In a retractable landing gear, a pair of rigid landing gear supports, a pair of landing gear struts, each of which at its inner end is pivotally mounted for movement in rectangularly opposed planes and one of which is yieldingly telescopic, an axle fitting to which both said struts are fastened at their opposite ends, a landing wheel secured to said axle, and means for retracting the landing gear.

12. In a landing gear for airplanes, two landing gear supports, an extension provided at the outer end of one of said supports, an arm pivoted at one end to said extension adjacent to its point of attachment to said support, a second arm pivoted at one end to the other support, a third arm pivoted at one end to said extension adjacent to its outer end, an axle fitting to which all of said arms are fastened at their ends opposite to said supports and said extension, and braces carried from said second named support to said first named support and to the outer end of said extension respectively.

In testimony whereof I hereunto affix my signature.

DANIEL J. BRIMM, Jr.